United States Patent [19]
Bruneel

[11] 3,856,610
[45] Dec. 24, 1974

[54] AUTOMOBILE FLOOR MAT CONSTRUCTION

[75] Inventor: Charles H. Bruneel, Mt. Clemens, Mich.

[73] Assignees: Emerance C. Bruneel, Anchorville; Hubert Champine, Mt. Clemens, both of, Mich. ; a part interest to each

[22] Filed: Aug. 14, 1972

[21] Appl. No.: 280,450

[52] U.S. Cl. .................... 161/43, 161/112, 296/1
[51] Int. Cl. ...................... B32b 1/04, B32b 3/10
[58] Field of Search ........ 161/43, 109, 112; 296/1 F

[56] References Cited
UNITED STATES PATENTS

| | | | |
|---|---|---|---|
| 1,883,737 | 10/1932 | Duffy | 296/1 F |
| 2,251,372 | 8/1941 | Nicholson | 161/111 |
| 2,505,554 | 4/1950 | Kravitz | 161/109 |
| 2,810,672 | 10/1957 | Taylor | 296/1 F |
| 2,850,423 | 9/1958 | Kramp et al | 296/1 F |
| 3,003,576 | 10/1961 | Dodge | 296/1 F |
| 3,016,317 | 1/1962 | Brunner | 161/109 UX |
| 3,130,807 | 4/1964 | McHenry | 161/109 UX |
| 3,328,227 | 6/1967 | Moseley, Jr. et al. | 161/109 X |
| 3,549,469 | 12/1970 | Wilfert | 161/109 X |
| 3,613,554 | 10/1971 | Koger et al. | 161/111 X |

*Primary Examiner*—Philip Dier
*Attorney, Agent, or Firm*—Basile and Weintraub

[57] ABSTRACT

A floormat construction especially suitable for use within the interior of automobiles and other passenger carrying vehicles, and comprising a body portion of a predetermined size and shape fabricated from an absorbant fibrous substrate of sufficient strength to maintain the predetermined shape when wet and supporting a load, such as the automobile passengers feet. The body portion is completely enclosed by a liquid impervious skin such as a polyurethane material with the skin adhering to the surface of the body portion. A portion of the skin associated with the top surface of the body portion is perforated to permit liquid thereon to pass through the skin and into a plurality of aligned bores extending a predetermined depth into the body portion for easy absorption of the liquid therein as well as to trap small particles of mud, dirt and the like.

5 Claims, 3 Drawing Figures

3,856,610

AUTOMOBILE FLOOR MAT CONSTRUCTION

BACKGROUND OF THE INVENTION

1. Field of the Invention

The present invention relates to mat constructions and, in particular, to a floor mat construction especially suitable for use in the interior of automobiles and other moving vehicles.

2. Description of the Prior Art

Heretofore, floor mats of varying designs and constructions have been employed for use on the floor of an automobile and, particularly, on the driver's side to protect the floor carpeting from the accumulation of mud, dirt, water and the like which may be brought into the car during inclement weather. Such floor mats are generally attractive in their design, however, the same are normally expensive and the accumulation of dirt, mud, water and the like thereon limits their useful life, particularly, when the consideration of the esthetic appearance of the floor mat is a factor in determining useful life. Further, the accumulation of water, mud and dirt on such prior art floor mats as a result of the movement of the passengers' feet during normal use of the automobile tends to push the mud, dirt, water and the like off of the mat and onto the carpeting resulting in soiling of the automobile carpeting. In addition, accumulation of the dirt, mud, water and the like can be frequently large enough to become a nuisance to the driver and, particularly, where mud, dirt, water and the like accumulate near the control pedals.

Accordingly, it would be desirable to provide a mat construction which will absorb all liquids carried into an automobile and which will accumulate and/or entrap small particles of dirt, mud, pebbles and the like; but which is extremely inexpensive in its construction and design so that the same may be discarded and replaced at little expense after its useful life has terminated.

SUMMARY OF THE INVENTION

The present invention which will be described subsequently in greater detail comprises an absorbant fibrous substract enclosed by a liquid impervious skin having an array of apertures permitting the passage of liquid, dirt and the like into the fibrous substrate for absorption and/or entrapment thereby.

Therefore, an object of the present invention is to provide a highly inexpensive, simplied mat construction of the aforementioned character designed to absorb large quantities of liquid and retain the same so as to not soil the flooring carpeting immediately therebelow.

It is also an object of the present invention to provide a mat construction of the character aforementioned which is inexpensive in its construction, durable, but which is of a disposable nature so that the same may be replaced at very little expense by a new mat after its useful life is terminated.

It is a further object of the present invention to provide a mat construction which will permit the driver or passenger of the vehicle employing the mat to clean and dry his feet as substantial portions of the mud, dirt, liquids or the like that are carried into the automobile are entrapped and/or accumulated within the mat to prevent the spilling thereover onto the automobile floor to prevent soiling of the same.

Other objects, advantages and applications of the present invention will become apparent to those skilled in the art of mat constructions when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views and in which.

DESCRIPTION OF THE PREFERRED EMBODIMENT

Figure 1:
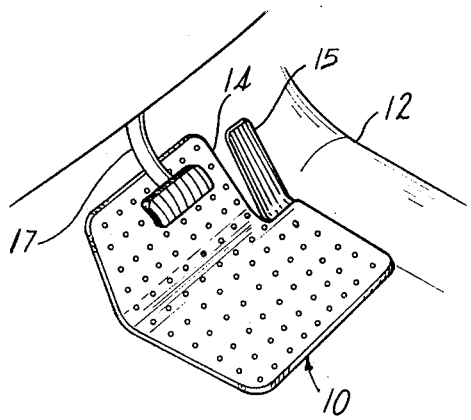
FIG. 1 is a perspective view of one example of a mat construction in position in the interior of an automobile, the mat construction being fabricated in accordance with the principles of the present invention.

Referring now to the drawing and, in particular, to FIG. 1, there is shown a general interior of an automobile having a floor mat 10 placed over the floor carpeting in the heavy traffic position in front of the driver's seat. As herein shown, the mat 10 simply placed over the regular carpeting or base mat of the automobile but, as it will be appreciated, the mat 10 can be contoured to extend over the elevated portion 12 of the automobile which portion 12 is the bulge in the floor which houses the transmission of the automobile. In the preferred embodiment, the car mat 10 is generally rectangular in shape having a cut out section 14 adapted to permit the insertion of the car mat 10 on the driver's side without interference with the automobile gas pedal 15. The adjacent section of the car mat generally slopes up against the fire wall of the automobile under the brake pedal 17 in a conventional manner.

Figure 2:
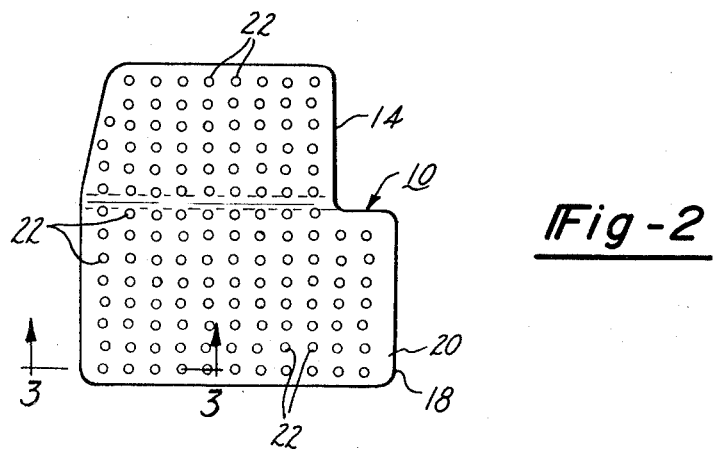
FIG. 2 is a top elevational view of the mat illustrated in FIG. 1.
Figure 3:
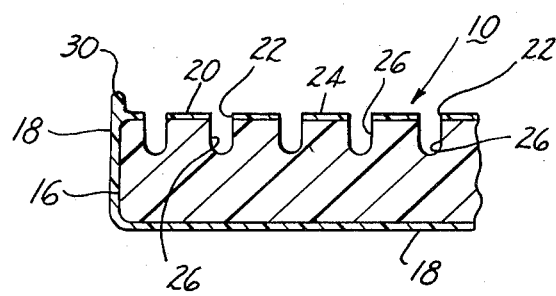
FIG. 3 is a fragmentary cross sectional view of the mat taken along line 3—3 of FIG. 2.

Referring now to FIGS. 2 and 3 for a more detailed description of the car mat 10 which, as can best be seen in FIG. 3, comprises a body portion 16 of a unitary construction and fabricated from an absorbant fibrous substrate such as a woven or non-woven fibrous fabric, fiberboard, paperboard, cotton, paper and any other suitable absorbing material and one which will retain its strength after wetting as will be described hereinafter. The body section 16 is completely enclosed by a fluid impervious skin 18 such that the bottom, side walls and top surface of the body section is completely liquid tight.

The upper surface 20 of the skin 18 is provided with a multiplicity of small perforations or aperature 22 approximately one-eighth of an inch in diameter and spaced at equal distances with approximately 12 to 14 openings per square inch over the entire upper surface area 20 of the mat 10. The apertures 22 extend completely through the upper surface area 20 and are aligned with bores 26 extending into the upper surface 24 of the body portion 16 a predetermined depth and preferably approximately one-third to one-half of the thickness of the mat 10. The apertures or bores 26 formed in the body portion 16 are aligned with the apertures 22 in the skin 18. In the preferred embodiment the car mat 10 would be approximately one-half to one inch in thickness.

When the driver of the automobile or a passenger enters the interior of the automobile and has water, mud, dirt or the like on his feet, the water will flow across the upper surface 20 of the skin 18, through the skin apertures 22 and into the bores 26 wherein the surface area of the bores 26 permits a quick absorption of the water into the body portion 16.

In addition, any foreign particles, such as dirt or mud carried by the passenger or driver will, due to the movement of the driver's feet, against the upper surface 20 drop through the apertures 22 and into the bores 26, and thus will not fall off of the car mat 10 onto the car interior carpeting and thereby the mat 10 prevents soiling or wetting of the interior carpeting.

The sides of the apertures 22 and bore 26 and their relative close spacing will insure that all water, dirt, mud, and the like carried into the interior of the automobile will be trapped by the body section 16. Since the body section 16 is completely enclosed by the liquid impervious skin 18; that is at the top, bottom and side walls, with the exception of the perforations 22, water so absorbed by the body portion 16 will not escape and cause soiling of the automobile carpeting.

In the preferred embodiment, the skin 18 may be fabricated from any suitable liquid impervious material and applied to the body section with a suitable adhesive however, in the preferred embodiment a polyurethane or polyethylene skin having self-adhering characteristics with a 0.5 mil to 1.0 mil thickness is preferred.

The peripheral edge of the upper surface 20 may be formed with a raised ridge 30 (FIG. 3) which, in addition to offering a decorative feature, may further function to prevent any water or foreign particles on the upper surface 20 of the car mat 10 from being pushed over the mat sides on to the floor carpeting.

The upper exposed surface 20 may carry printed advertising indicia or any other desired indicia such as a large logo or the like representing the manufacturers trademark, name or the like.

The mat 10 which is extremely inexpensive to manufacture is adapted to be discarded and replaced with the new mat after the old mat has accumulated such amounts of water, dirt, mud and the like that its useful life is terminated. The design of the mat, however, should be such that it will have a relatively long life while soiling the automobile floor carpeting.

It can thus be seen that the present invention has provided a disposable car mat adapted to receive and retain substantial amounts of liquids, such as water, dirt, mud and the like while continuing to function for a considerable period of time, the same being of a very inexpensive construction and thus, adapted to be discarded and inexpensively replaced with a new mat and after its useful life has terminated.

Although only one form of the present invention has been disclosed, it should be apparent to those skilled in the art of mat constructions, that other forms may be had all coming within the spirit of the invention and the scope of the appended claims.

What is claimed is as follows:

1. A floor mat construction for absorbing liquids and holding foreign particles, said mat comprising:
    a body portion of a predetermined shape for facilitating the positioning of said mat upon a portion of a floor of an automobile, said body portion having a bottom surface and a top surface, said body portion being a liquid absorbing material and of a strength sufficient to maintain said predetermined shape when the body portion is wet;
    a liquid impervious skin completely enclosing said body portion and adhering to the exposed surfaces of said body portion, the portion of said skin in contact with said body portion top surface being perforated to permit liquid and foreign particles thereon to pass therethrough, respectively, for absorption and storage by said body portion, said skin enclosed body portion being of a strength sufficient to support the weight of the feet of a passenger in said automobile; and
    an upright ridge disposed along the peripheral edge of said top surface and extending above said top surface to form a barrier to restrain the movement beyond said edge of any liquids and foreign particles disposed on said top surface.

2. The mat construction defined in claim 1 wherein said body portion is a material selected from the group consisting of a woven fibrous material, a non-woven fibrous material, fiberboard, paperboard, paper, and cotton.

3. The mat construction defined in claim 1 wherein said liquid impervious skin is a material selected from the group consisting of polyethylene and polyurethane.

4. The mat construction defined in claim 1 wherein said perforations are a plurality of bores extending through the upper surface of said skin, said body portion top surface having a plurality of bores extending from said top surface a distance at least one-third of the thickness of said mat, said bores in said body portion being aligned with said bores in said skin.

5. The mat construction defined in claim 4 wherein said liquid impervious skin is a material selected from the group consisting of polyurethane and polyethylene.

* * * * *